Figure 2:
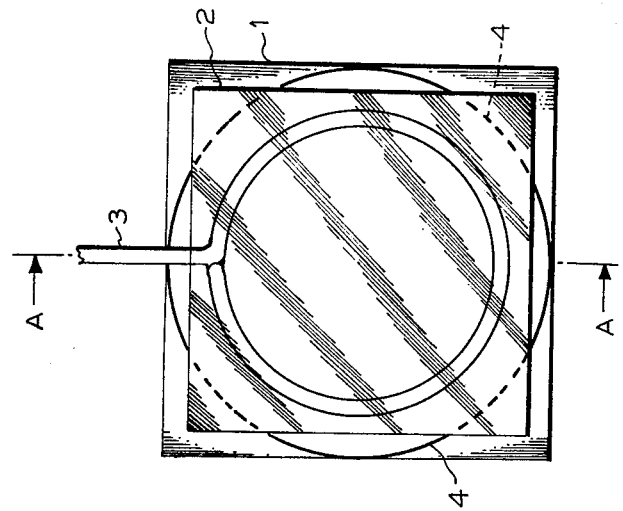

United States Patent

Berne et al.

[15] 3,668,537

[45] June 6, 1972

[54] SYSTEM OF LIQUID ELECTRODES FOR POCKELS CELLS AND LIQUID COMPOSITIONS FOR SAID ELECTRODES

[72] Inventors: Adriano Berne; Mario Cesarotti; Glauco Benedetti Michalagelli, all of Rome, Italy

[73] Assignee: Selenia Industrie Elettroniche Associats S.p.A., Rome, Italy

[22] Filed: Aug. 6, 1969

[21] Appl. No.: 848,046

[30] Foreign Application Priority Data

Aug. 31, 1968 Italy....................................39447 A/68

[52] U.S. Cl...............................................330/4.3, 350/150
[51] Int. Cl............................................................H01s 3/10
[58] Field of Search...........................350/150, 160, 161, 267; 330/4.3

[56] References Cited

UNITED STATES PATENTS 3,393,956    7/1968    Clark.......................................350/150

FOREIGN PATENTS OR APPLICATIONS 1,173,033    12/1969    Great Britain..........................350/150

Primary Examiner—Rodney D. Bennett, Jr.
Assistant Examiner—N. Moskowitz
Attorney—Wenderoth, Lind & Ponack

[57] ABSTRACT

A Pockels cell with liquid electrodes, in which said electrodes comprise a water solution formed by the salt of the electro-optical crystal and by another simple salt having an ion common with that of the salt of the electro-optical crystal.

6 Claims, 3 Drawing Figures

INVENTORS
ADRIANO BERNE'
MARIO CESAROTTI
GLAUCO BENEDETTI MICHELANELI

BY *Wenderoth, Lind & Ponack*
ATTORNEYS

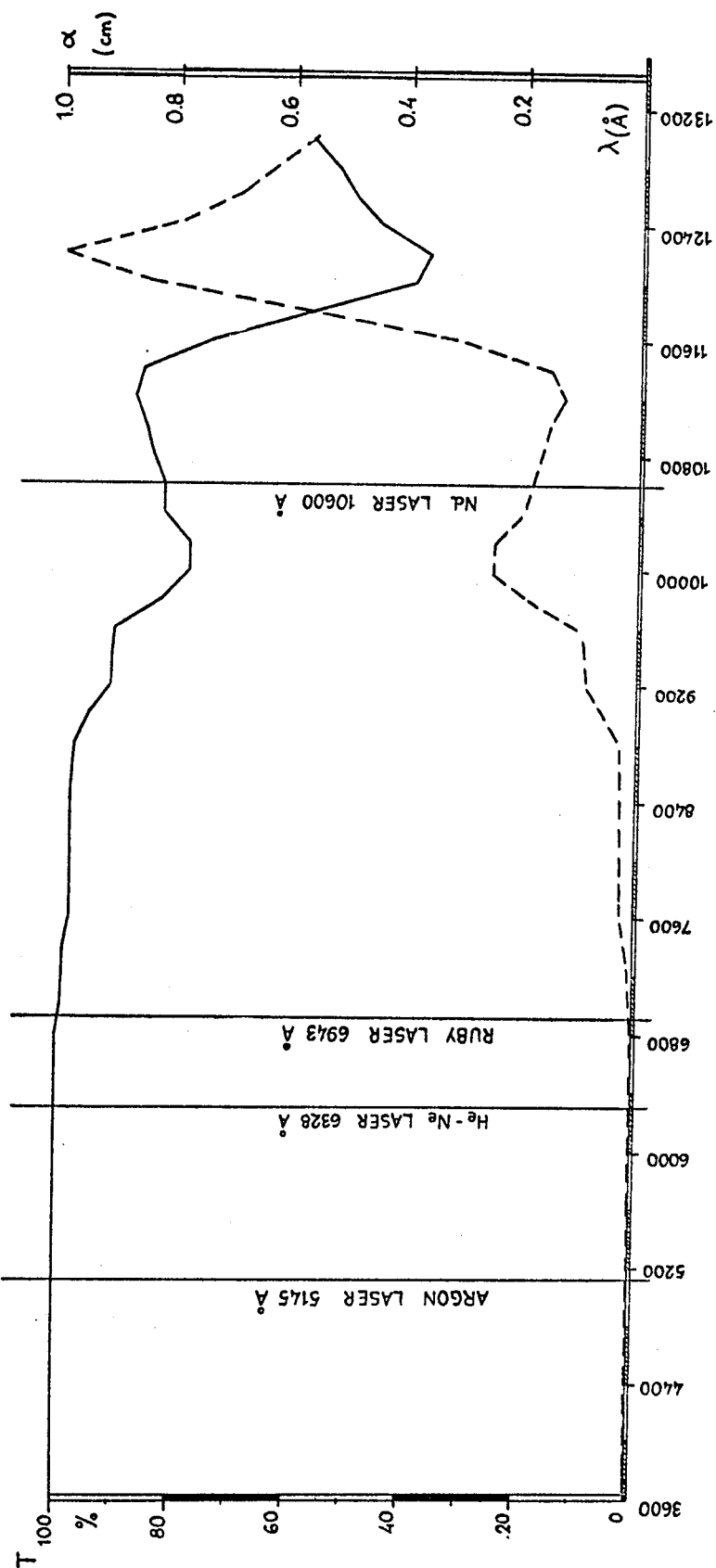

SYSTEM OF LIQUID ELECTRODES FOR POCKELS CELLS AND LIQUID COMPOSITIONS FOR SAID ELECTRODES

The present invention relates to a system of liquid electrodes for Pockels cells and to the liquid composition for said electrodes.

In the embodiment of the Pockels cells exploiting the longitudinal electro-optical effect, the greatest problem to be solved is that concerning the electrodes to be used for generating the electric field.

The quality of a Pockels cell is evaluated on the bases of a high optical transmittance, a good uniformity of electrical field such as to ensure, when the cell is energized, the complete extinction of the luminous beam passing through it, and a low electric loss. Said features depend at the utmost upon the structure of the electrodes of the cell, which electrodes in the case of the longitudinal electro-optical effect, are also passed through by the light beam passing through the cell.

Various solutions have been found for the embodiment of said electrodes, like the net electrodes, the annular electrodes, the conductive glass electrodes and the transparent layer electrodes, but none of these embodiments proved to be entirely satisfactory.

The net electrodes, even if ensuring a good uniformity of the electric field, have a high optical absorption (of the 30–40 percent order) associated to diffraction phenomena.

The annular electrodes, on the other hand, have the advantage of having the maximum optical transparency, but do not allow the obtaining of a uniform electric field. Furthermore, for a good operation of the cell, it is required that the ratio between the distance between the electrodes and the aperture of the electrode itself be $\geq 1.2$, requiring thus great thicknesses of electro-optical materials when the Pockels cells must be used with light beams having large cross dimensions. Moreover said electrodes, due to the high lack of homogeneity of the field, require bias voltages greater than those required by the electro-optical materials themselves.

Little is known about the conductive glass electrodes; it is only known that they have a rather high coefficient of optical absorption, amounting to about 40 percent, a remarkable lack of homogeneity of composition and a high resistivity.

The deposited transparent electrodes are those which until now have afforded the best results. Said electrodes consist of very thin layers of conductive material deposited on quartz plates cemented to the electro-optical materials with low resistivity cements. Said electrodes produce a very uniform field, their resistance is rather low (of the order of some hundreds or thousands of ohm square) whereby their electric loss is contained within non-excessive values for not very high operative frequencies, and have a good optical transmittance which for the best specimens is greater than 95 percent. With said electrodes it is also possible to use thin crystals (of the order of a few millimeters) for remarkable crosswise dimensions. But these optimum features reached by the last described electrodes, are not sufficient when it is necessary to operate at high frequencies or it will be necessary to use several cells in serial sequence (as in the case of the digital deflectors) as in the first case the electric losses and in the second the optical absorptions will have a pre-eminent importance.

Another solution for transparent electrodes consists in the use of liquid electrodes, having a high electric conductivity and which allow the advantage of a high transparency to be coupled to a low loss and to a high field uniformity.

The electro-optical crystals are generally highly soluble and can be easily attacked. It is impossible to use protective layers on the crystal as said layers having, in that they are highly transparent, a high resistivity, would introduce in the system high capacities and resistances in series, which would lead to remarkable increases of the field necessary to the rotation of the half wave polarization plane, apart from the transient phenomena.

According to the present invention liquids for electrodes for electro-optical crystals are provided, having features as follows: high electric conductivity; high composition stability in the presence of the crystal, also for remarkable thermal excursions; physical and chemical compatibility with the crystal; high optical transparency; a refractive index very near to that of the crystal; high response speed to the electrical pulses, and finally inalterability of physical and chemical structure in the presence of high intensity and coherence light beams.

Said liquids consist of a water solution formed by the salt of the electro-optical crystal and a simple salt having an ion in common and a solubility index slightly variable with the temperature. In order to bring the refractive index of said solution as near as possible to that of the used electro-optical crystal, said solution will be then mixed with a highly transparent liquid having a high refractive index and being infinitely soluble in water. The contents of said liquid in the solution is a maximum in order to have a high electric conductivity that is slowly variable when the concentration changes.

Various Pockels cells with liquid electrodes according to this invention have been embodied using as electro-optical material KDP and ADP crystals.

The principles subsequently set out and the obtained results can be, however, easily generalized and extrapolated for all other electro-optical crystals.

LIQUID ELECTRODE POCKELS CELLS

The features which substantially differentiate the Pockels cell with liquid electrodes according to this invention, from a common cell are as follows:

1. The thickness of the electro-optical crystal can be limited to the minimum indispensable value due to manufacture. In fact the liquid electrode allows the operation under electric fields greater than the breakdown limits of the crystal itself. Furthermore no problem of homogeneity of the electric field exists, as the electrodes formed by liquids perfectly mate the shape of the surface. This last cited feature is common with the cells with deposited electrodes.

2. The liquid electrodes allow the use of crystals with a coarse surface manufacture. In fact in the cells where the electrodes do not adhere to the crystal, each variation of the thickness of the latter originates a variation of the optical path, the electric field remaining constant. In the cells with deposited electrodes, the deposition is difficult if the surface has a slight degree of finishing. In both cases any deformation of the surfaces, be it macroscopical (curvature) or microscopical (roughness) originates a deformation of the issuing wave which is proportional to the difference in refractive index existing between the crystal and the surrounding medium (usually air). In the case of liquid electrodes this sudden difference is extremely reduced.

If the cell requires closure glasses, it will be sufficient that only the outer surfaces thereof be optically worked out. This moves the problem of the manufacture of the surfaces from the crystal (hardly workable, expensive and brittle) to the glass (easily workable and not expensive).

3. The liquid electrodes as aforesaid, allow the embodiment of cells having a transmittance remarkably high with respect to the usual cells. In said conventional cells, use is made of either transparent conductive electrodes (with a high absorption) or apertured electrodes rendering necessary high thicknesses of electro-optical material for obtaining sufficiently uniform fields. The advantage of the high transmittivity is particularly remarked in electro-optical systems such as for instance the digital deflection systems using several cells in series, and the laser systems using one Pockels cell for the Q-switch. In the latter systems each absorbing element, beyond causing a remarkable Q reduction of the resonant cavity, is easily destroyed by heating by the laser beam itself. In the arrangement according to this invention the necessary very thin layer of liquid (which can be less than 0.1 mm) has a high transparency throughout the visible spectrum (see FIG. 3) for the case of the solution $a$), and a refractive index sensibly close to the average index of the electro-optical crystal which reduces the losses due to reflection at the passages liquid-crystal-liquid, thus limiting the losses practically within the absorption values of the crystal ($\approx$ 8 percent for 3 mm).

Figure 1:
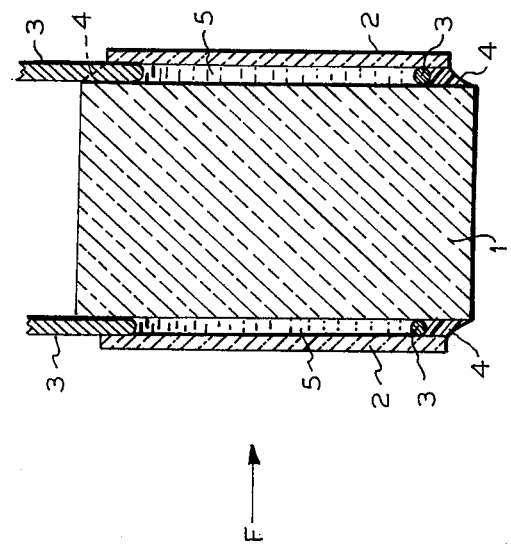

FIGS. 1 and 2 are generally representative of a Pockels cell in which the electrode of the present invention are used. FIG. 1 is a sectional view along the plane A—A of FIG. 2, the latter being a front view of the cell. In FIGS. 1 and 2, the element 1 is the electro-optical crystal, the elements 2 are optically transparent plates, the elements 3 are the wire electrodes, 4 is the sealing cement and the elements 5 are the thin layers of the filling liquid of the invention described above.

TEST RESULTS

The liquid-electrode Pockels cells according to this invention have been experimentally embodied as follows:

One KDP crystal and one ADP crystal, dimensioned 2.5×2.5×cm with an optical axis perpendicular to the 2.5×2.5 cm faces, are flattened and polished using dry abrasive cloths (both KDP and ADP are highly soluble in water).

The final surfaces seem polished, but when carefully examined, a remarkable roughness is still visible. To the so worked crystals two plates of optically worked quartz are adhered by means of silicone glue on the interposition along the edge of the crystal of a 0.1 mm wire of silvered copper, utilized both as spacer for allowing the introduction of the liquid, and as electric connection; the cells are filled with the various liquids hereinafter described [the KDP with the various liquids $a$ and $c$ and the ADP with the various liquids of $b$ and $c$], then sealed and submitted to the following tests:

a. Test of stability of operation in times.

During the tests lasting several days an optimum reproducibility of the value of the potential of $\lambda/2$ for determined wave lengths was found.

b. Tests in laser cavity.

The cell has been placed in various ruby and neodymium laser glass cavities. Single giant pulses have been obtained reproducible in amplitude and duration. Also under powers emitted by the laser in the order of 10 joule (peaks of 260 MW having a 15 $\mu$sec duration) the cell appears not to have been damaged to any measure.

c. Non-linear effects.

Measures effected in the liquid revealed the existance of no appreciable Raman effect.

d. The cell has been used as a shutter between two crossed polarizers. Energized with electric pulses with rise times of about 7 nano sec. the form of the output luminous signal result was equal to that of the electric signal itself.

From the above appear very clearly the advantages of this Pockels cell with liquid electrodes, with respect to the other types, said advantages being summarized as follows:

a high stability with temperature
a high optical and field homogeneity
a low resistivity, with the consequent low electrical losses even under high repetition frequency operation
speed of response
low optical losses
negligible non linear effects
easy of manufacture and low cost.

Some solutions according to this invention are as follows:

a. A saturated solution of KDP and KCl in water. The optimal solution was so composed: per 100 cc of water, 24 gms of KCl and 16 gms of KDP. This liquid has been then mixed with glycerin, used as the transparent, high refractive-index, liquid, in the amount of one part of solution per four parts of glycerin.

b. A saturated solution of ADP and $NH_4Cl$ in water. The optimal solution was so composed: per 100 cc of water use was made of 36 gms of $NH_4Cl$ and 24 gms of ADP. This liquid has been mixed with glycerin used as the high refractive-index transparent liquid, in the amount of one part of solution per four parts of glycerin.

c. A saturated solution of KDP, KCl, ADP and $NH_4Cl$ in water: the optimal solution was so obtained: per 100 cc of water, use was made of 24 gms of KCl, 16 gms of KDP, 36 gms of $NH_4Cl$ and 24 gms of ADP. The liquid has been then mixed with glycerin, used as the high refractive-index transparent liquid in the amount of one part of solution per four parts of glycerin. The obtained liquids had the features shown in the Table:

| | Solution KDP+KCl in glycerin | Solution ADP+$NH_4Cl$ in glycerin | Solution KCl+KDP+$NH_4Cl$+ADP in glycerin |
|---|---|---|---|
| $\eta$, 5,145 A | 1.445 | 1.445 | 1.445 |
| Absorption coefficient, $\chi$ 5,145 A | 0.01 cm.$^{-1}$ | 0.01 cm.$^{-1}$ | 0.01 cm.$^{-1}$ |
| Resistivity, $\rho$ | 115$\omega$ cm. | 230$\omega$ cm. | 72$\omega$ cm. |
| Thermal stability | 10÷30° C. | 15÷50° C. | 15÷30° C. |

The liquid a) serves as an electrode for KD*P or KD*P crystals, the liquid b) for ADP crystals and the liquid c) for KDP, KD*P and ADP crystals.

All features described were never found simultaneously in the previously embodied Pockels cells.

Said cells can be also used as amplitude modulators, connecting several cells in series for lowering the half wave potential, this being feasible without inconveniences in view of the high transparency of the cells.

Having thus described the present invention, what is claimed is:

1. A Pockels cell with liquid electrodes, characterized in that said electrodes comprise a water solution formed by the salt of the electro-optical crystal and by another simple salt having an ion common with that of the salt of the electro-optical crystal.

2. A pockels cell as claimed in claim 1, wherein said second additive salt is selected among the salts having a solubility index slightly variable with the temperature.

3. A Pockels cell as claimed in claim 1, wherein said solution is mixed with a highly transparent liquid having a high refractive index and soluble in water.

4. A Pockels cell as claimed in claim 1, wherein the electro-optical crystal consists of KDP (monobasic potassium phosphate) or KD*P (marked monobasic potassium phosphate) and said electrodes are made of saturated solutions of KDP and KCl in water mixed with glycerin.

5. A Pockels cell as claimed in claim 1, wherein the electro-optical crystal consists of ADP (monobasic ammonium phosphate) and said electrodes consists of saturated solutions of ADP and $NH_4Cl$ in water to which glycerin has been added.

6. A Pockels cell as claimed in claim 1, wherein the electro-optical crystal consists of KDP or KD*P or ADP and said electrodes consist of saturated solutions of KDP, KCl, ADP, and $NH_4Cl$ in water to which glycerin has been added.

* * * * *